No. 633,559. Patented Sept. 26, 1899.
J. B. BARTHOLOMEW.
PNEUMATIC STACKER.
(Application filed Feb. 1, 1893. Renewed Nov. 18, 1898.)

(No Model.) 4 Sheets—Sheet 1.

Witnesses:
Wm H. Edwards
Arthur L. Bigant

Inventor
J. B. Bartholomew
by H. H. Bliss atty

No. 633,559. Patented Sept. 26, 1899.
J. B. BARTHOLOMEW.
PNEUMATIC STACKER.
(Application filed Feb. 1, 1896. Renewed Nov. 18, 1898.)
(No Model.) 4 Sheets—Sheet 2.

Witnesses:
Wm H. Edwards
Arthur L. Bryant

Inventor:
J. B. Bartholomew
by
H. H. Bliss
atty

THE NORRIS PETERS CO., PHOTO-LITHO., WASHINGTON, D. C.

No. 633,559. Patented Sept. 26, 1899.
J. B. BARTHOLOMEW.
PNEUMATIC STACKER.
(Application filed Feb. 1, 1898. Renewed Nov. 18, 1898.)
(No Model.) 4 Sheets—Sheet 3.

Witnesses:-
Inventor:-
J. B. Bartholomew,
by
H. H. Bliss att.

THE NORRIS PETERS CO., PHOTO-LITHO., WASHINGTON, D. C.

No. 633,559. Patented Sept. 26, 1899.
J. B. BARTHOLOMEW.
PNEUMATIC STACKER.
(Application filed Feb. 1, 1898. Renewed Nov. 18, 1898.)

(No Model.) 4 Sheets—Sheet 4.

Witnesses
C. D. Hesler.
C. A. Longfellow.

Inventor
J. B. Bartholomew
By H. H. Bliss
Attorney

THE NORRIS PETERS CO., PHOTO-LITHO., WASHINGTON, D. C.

UNITED STATES PATENT OFFICE.

JOHN B. BARTHOLOMEW, OF PEORIA, ILLINOIS, ASSIGNOR TO THE AVERY & ROUSE STEAM THRESHER COMPANY, OF SAME PLACE.

PNEUMATIC STACKER.

SPECIFICATION forming part of Letters Patent No. 633,559, dated September 26, 1899.

Application filed February 1, 1896. Renewed November 18, 1898. Serial No. 696,826. (No model.)

*To all whom it may concern:*

Be it known that I, JOHN B. BARTHOLOMEW, a citizen of the United States, residing at Peoria, in the county of Peoria and State of Illinois, have invented certain new and useful Improvements in Pneumatic Stackers; and I do declare the following to be a full, clear, and exact description of the invention, such as will enable others skilled in the art to which it appertains to make and use the same, reference being had to the accompanying drawings, and to the letters of reference marked thereon, which form a part of this specification.

Inasmuch as the matters constituting more particularly the features or improvement herein can be applied to any of the forms of threshing-machines now well known, it is unnecessary to describe in detail the parts which constitute the thresher proper, although I have herein (in Fig. 2) illustrated more or less conventionally an entire threshing-machine in order that an understanding can be readily had of the relation thereto of the stacking devices.

A indicates the body part of the thresher, it being supported upon front and rear wheels $a\ a'$. The cylinder is situated in that part of the thresher indicated by B, and the straw is carried from that end of the machine longitudinally through it to the rear end, the winnowing-fan and the vibrating shoe being arranged in a well-known way in that part of the body or casing indicated by C.

The straw, which is finally delivered from the separator, is deposited in the receptacle at D at the rear end of the machine, the latter having a sloping bottom $d$, inclined toward one side of the casing.

E represents a fan-casing the eye of which communicates with the interior of the chamber D. Inside of this fan-casing there is arranged a fan E', which also, as concerns the details of its construction, can be made in any now well-known form.

Figure 14:
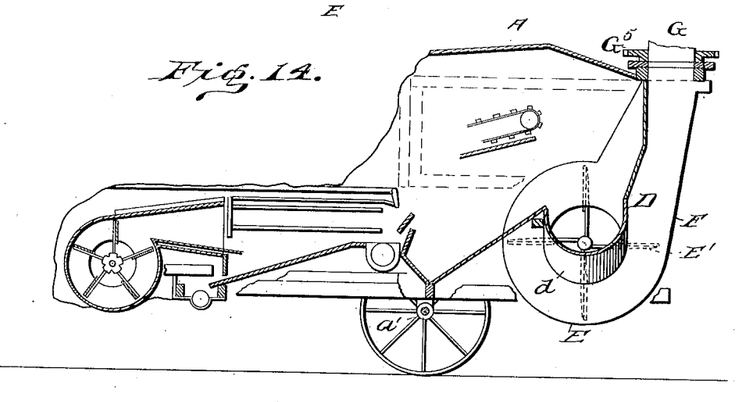
Fig. 14 is a longitudinal vertical section of the rear end of the separator-casing shown in Figs. 1 and 2.
Figure 15:
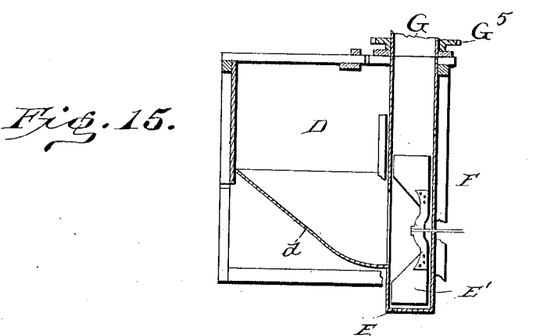
Fig. 15 is a transverse section of the same.

The straw and chaff chute or guide at D $d$ in its relations to the other parts is shown in Figs. 14 and 15. It will be seen that the straw is first deposited in this chute or receptacle D and that it then moves along the bottom thereof, which is inclined downwardly and transversely of the machine, to the ejector-duct for the fan-casing, it, as shown, being on the transverse lines of the eye of the fan and delivering the straw thereto, so that the latter can be carried to the adjustable delivery-duct G above.

Inasmuch as the present invention does not pertain to the details of any particular style of grain-winnower or style of straw-carrier within the separator, it is unnecessary to describe these parts in detail, as they may be of any suitable sort, there being a conventional illustration of such straw-carrier and winnower in Fig. 15. So, too, the rotary movements or horizontal adjustments of the main pneumatic delivery-ducts G G' G² can be effected by any suitable gearing or other devices such as now well known. A common mechanism for this purpose is more or less conventionally illustrated in the drawings, there being at G⁵ a toothed ring or gear-wheel at the lower part of the delivery-duct, driven by gearing supplied with reversing devices, (shown generally at G⁶.)

The delivery-duct leading out from the fan is indicated by F, it extending to a plane at or near the plane of the top or roof of the casing. Upon said roof there is arranged a vibrating support to carry a wind-trunk, which communicates with the aforesaid duct F through an intermediate joint-piece.

In an earlier application, Serial No. 550,986, filed by me on the 28th day of May, 1895, I have shown and described a pneumatic straw-stacking mechanism which as concerns a number of the features of the arrangement and details of construction is more or less similar to that herein and to which reference may be made for a fuller understanding of said details; but my experience with the construction of the earlier sort has led me to a number of my improvements which I have herein shown and will describe.

G indicates the hood or lower section of the trunk, through which the wind, straw, chaff, &c., are ejected.

G' indicates the inner longer duct-section. At the lower end it is so connected to the section G that it can be moved vertically without impairing the substantially air-tight joint with such part G.

G² indicates a third or outer duct-section telescopically connected to the section G' and adapted to both slide longitudinally thereon and also to be axially rotated more or less. At its outer end it has a segmental head-like portion G³, which can be either advanced or withdrawn or can be turned around the longitudinal axis of the duct for a purpose to be described.

At the lower end the part G' is connected to the vibrating support or framework in substantially the manner described in my said earlier application—that is to say, it has yokes or bracket-arms at $g$, which at their lower ends are provided with rollers $g'$, fitted in guides $g^2$, having curvilinear slots. In addition to these it is provided with a supporting-yoke $g^4$, which carries rollers $g^5$, that engage with the curved guide $g^6$ behind the air-duct and rigidly secured to the vibrating frame.

H is a bracing-bar lying below and approximately parallel to the parts G' and G². At its rear end it is rigidly secured to the frame part above described, preferably near the bracket-strap $g$, and at a point as far outward as possible it is connected by a bracket or strut $h$ to the tube-section G'. At its outer end it is pivotally connected to an inclined brace having the parts I and I'.

The part I is tubular and adapted to receive the lower part I', the latter being a ratcheted rod which can move longitudinally into the tube, the ratchet-teeth being shown at $i$.

I² I³ are dogs adapted to engage with the teeth $i$. The dog I² is pivoted to the vibrating yoke I⁴, and the dog I³ is secured by a stationary pivot.

The yoke I⁴ carries a lever I⁵, by means of which the operator can at any time impart a step-by-step movement longitudinally to the part I of the brace, so as to throw upward the bar H and the parts secured thereto. The dogs I² and I³ mutually act to prevent any retraction of the part I when the lever I⁵ is being moved.

The brace I I' is at the lower end pivotally connected to the swinging support or hinge-like plate J. Said support J is pivoted at $j$ to a supplemental hinge-plate or swinging carrier J', and the latter is pivoted to the framework of the machine at $j'$.

Figures 1, 5, 6, 7, 8:
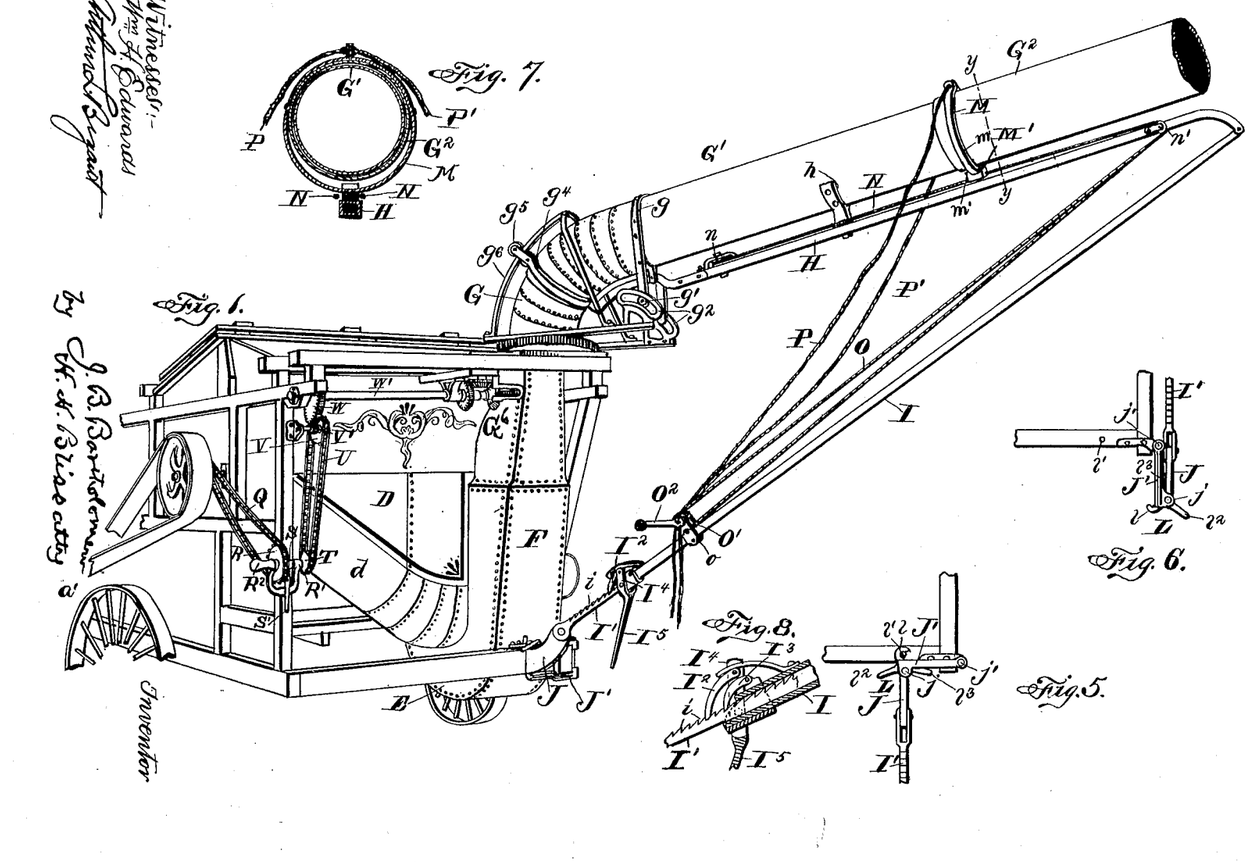
Figure 1 is a perspective of a sufficient portion of a thresher and straw-stacking mechanism to illustrate the manner of embodying my improvements.
Fig. 5 is a side view of the parts which constitute the lock for holding the stacker-tube in operative position.
Fig. 6 is a similar view of said lock when its parts are in the position occupied at the time the tube is in its inactive position or folded.
Fig. 7 is a cross-section of the stacker-tube and attached parts on the line $y\ y$ of Fig. 1.
Fig. 8 is a sectional view, on an enlarged scale, of the pawl mechanism for regulating the length of the brace.
Figure 2:
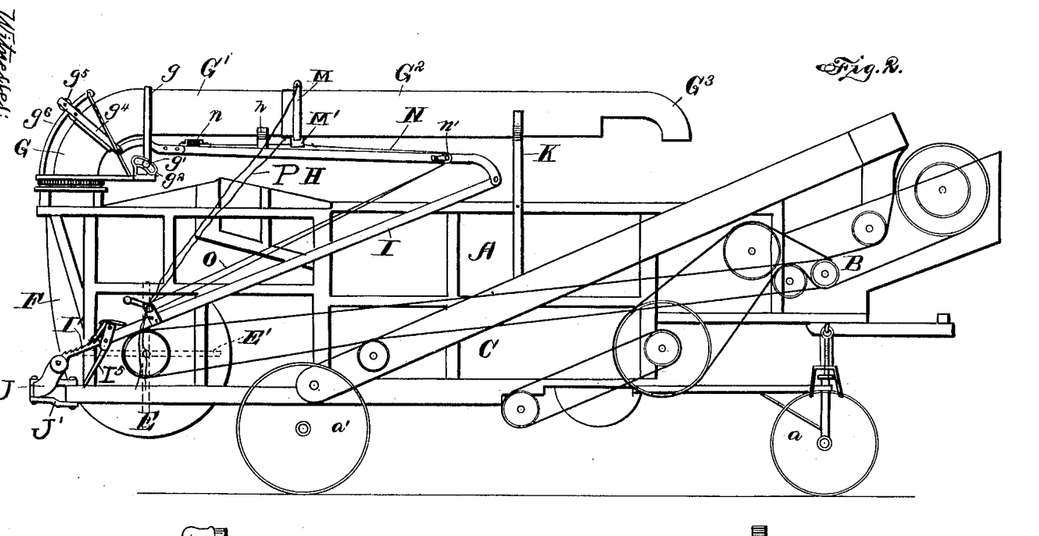
Fig. 2 is a side elevation of the entire machine.
Figure 3:
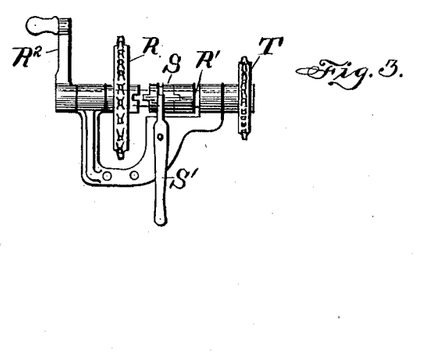
Fig. 3 shows, detached, some of the devices for driving the shaft which imparts the reciprocating movement to the stacker.
Figure 4:
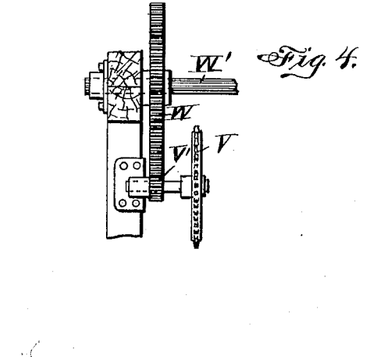
Fig. 4 is a view of another portion of said driving mechanism.
Figure 9:
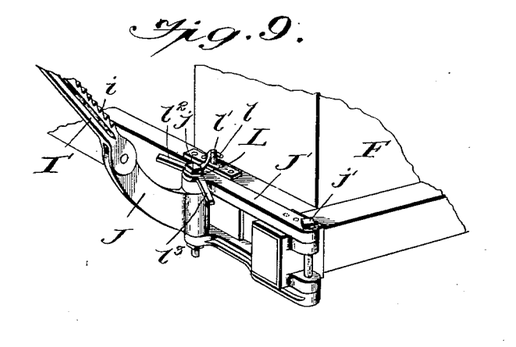
Fig. 9 is a detail perspective view of the supporting devices for the lower end of the brace, the parts being in the positions occupied when the stacker-tube is in operative position.
Figure 10:
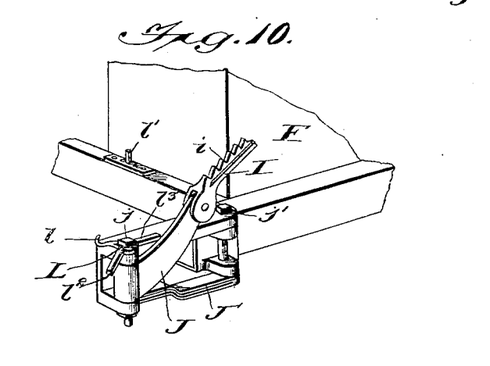
Fig. 10 is a similar view, the parts being in the positions occupied when the stacker-tube is swung forward.
Figure 11:
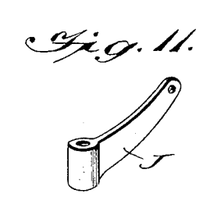
Figs. 11 to 13 are detail views of the members or parts of the said support for the lower end of the brace.
Figure 12:
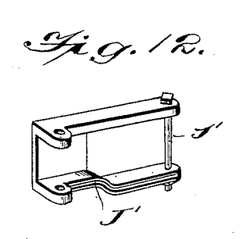
Figure 13:
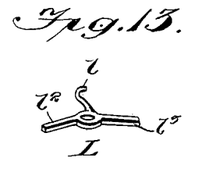

On examining Fig. 6 it will be seen that the parts last described can be turned into such position as to permit the brace I I' to swing around to the side of the machine and lie in a vertical plane substantially parallel to the machine, this being necessary when the stacker-tube is to be put in its inactive position and lowered for transportation. At such time it rests upon a pillow or support K near the front end of the thresher, as shown in Fig. 2.

By examining Fig. 5 it will also be seen that the pivots at $jj'$ are so related that the brace I I' can be moved around behind the machine, so as to lie in another vertical plane parallel to the longitudinal planes of the machine. To hold it in this latter position, I employ a lock which acts automatically. This is indicated as a whole by L. It is formed of a plate or bar having a hook $l$, adapted to engage with a pin or stud $l'$ on the framework. It is also formed with two levers or trip-arms $l^2$ $l^3$ and is pivoted to the plate J' at the point $j$. The trip-arms $l^2$ $l^3$ lie in the path of the swinging plate or bar J. When the stacker-tube is being swung around from the inactive position (shown in Fig. 2) to the position of operation, the plates J' and J move around the pivots at $j'$ and $j$ until finally the plate J bears against the trip-arm $l^2$ and compels the hook $l$ to firmly engage with the pin $l'$. When the machine is in operation and the stacker-tube is being vibrated from side to side in the ordinary manner, it is stopped by the reversing mechanism at either limit of its movement before the plate J can impinge upon the trip-arms $l^2$ $l^3$; but when it is desired to fold the parts around in the inactive position again the plate J is carried far enough to strike the trip-arm $l^3$, which automatically releases the hook $l$ from the pin $l'$, and thereupon the plates J and J' are freed to rotate far enough to allow the brace-rod I I' to swing around to the side of the separator. In brief, the brace-rod automatically locks itself in working position and automatically releases itself from the locked position.

The axis of the pivot at $j$ should be on the axial line of the toothed ring or vibrating mechanism at the base of the straw-tube. The sliding section G² of the straw-tube is moved or telescoped in relation to the section G' as follows:

M is a ring or band extending partly or entirely around the sliding section $G^2$.

M' is a block or rope attachment loosely engaging with the ring or band M. They may be loosely joined by having a flange $m$ formed on or secured to the ring and having engaging lips or flanges $m'$ on the block or attachment M'.

N is a rope or cable extending from a sheave $n$ on the bar H to the sheaves $n'$ near the outer end of the bar. The ends of the cable are connected to the ends of a chain O, which extends downward to and around and engages with a sprocket O', mounted in a bracket $o$, secured to the brace-bar I and having a crank $O^2$. The chain and rope or cable together constitute an endless flexible device. One side or strand of the cable is secured to the above-described block or attachment-piece M'. It will be seen that if the crank $O^2$ be turned in one direction the draft will be exerted on the sliding tube-section in such way as to cause it to move out on the tube-section G' and that if the crank is turned oppositely said tube-section will be drawn in. In this way the total length of the air and straw duct can be readily adjusted.

The end piece or head $G^3$ of the duct being integral or solid with the telescoping part $G^2$, I provide for rotating both these parts $G^2$ and $G^3$ in order to guide or deflect the straw to the right or the left horizontally.

P P' indicate one or more ropes. The part P is secured to the top of the aforesaid band or ring M and extends down on the right-hand side of the straw-tube. The part P' extends down from the top of the ring on the left-hand side of the tube. The lower ends of the rope or ropes are temporarily supported in any suitable manner. When it is desired to direct the escaping straw toward the right, a pull is exerted upon the left-hand rope P', which rocks or turns the telescoping part $G^2$ of the tube in the proper manner to effect this. When it is desired to turn the straw to the left, downward draft is exerted upon the other rope P.

It is sometimes desirable to throw the oscillating mechanism which vibrates the duct out of action even when the vibrator and separator continue in motion.

Q is the drive-chain, which brings power from a suitable sprocket to the sprocket R on the shaft R' at the rear of the machine. This shaft is also provided with a sprocket T, a clutch S, and a crank $R^2$. The power-receiving wheel R is loose on the shaft.

U is a chain extending from the sprocket T to the sprocket-wheel V. The latter rotates a pinion V', which engages with a spur-wheel W on the shaft W', the latter being connected to the gearing forming the principal part of the oscillating devices. These devices may be substantially similar to those in my aforesaid earlier application and need not be here described in detail.

Whenever it is desired to disengage the stacker mechanism from the thresher and separator, it can be readily done by moving the lever S', which throws the clutch S out of engagement with the wheel R. While so held out the operator by hand can actuate the crank $R^2$ in such way as to swing the straw-tube to the right or the left, as desired, and to whatever extent is wished.

It will be seen that with the stacking mechanism illustrated and above described but a single operator is required at the rear end of the machine and that he can accomplish all of the necessary adjustments and manipulations while standing upon the ground, whether it be the elongating or shortening of the straw-duct by the crank $O^2$ or the elevating or lowering of the tube by the lever $I^5$, or the guiding to the right or to the left of the escaping straw by the ropes P P' or the throwing out of action of the oscillator by the clutch S' and the turning of the duct to one side or the other by the crank $R^2$. Thus I avoid the necessity of having an operator upon the top of the machine or in an elevated position, as has been required with many of the earlier styles of construction.

It will be seen that the duct of trunk is supported by devices of the nature of a crane, the important members of which are below the trunk, these being a bar or bars supplemental to the trunk and stationary relatively to the inner section thereof, although vibratable and adjustable therewith, and a downward and inclined brace, which is also stationary with respect to the inner section of the trunk, but vibratable therewith, it constituting the extension member of the support.

A pneumatic stacker having the features of construction which I have herein presented is superior to others with which I am acquainted, not only in giving the strong and effective vertical support due to this under brace or bar, but also because I can remove from above the trunk all of the upwardly-projecting parts employed in earlier constructions which have prevented the machine from being taken into barns or other places where obstructions were present. When the trunk is in the horizontal position, the downward force at the outer end is at its maximum, and this decreases as the trunk is carried toward the vertical. With an under brace of the sort herein shown the parts can be so arranged, without increasing the height of the entire mechanism, that the angle of the brace at its outer end shall be such that it can easily take the entire downward thrust in whatsoever position the trunk may be adjusted vertically.

I am aware of the fact that braces have been employed in connection with the frames of endless belts used for various purposes, including the carrying of straw; but I believe myself to be the first to have devised a pneumatic stacker and an under brace therefor—to wit, a brace extending downward and backward from a point relatively near the outer end of the inner trunk-section—and both so arranged that they can be readily applied to the rear end of a thresher in such way as to dispense with the numerous parts and complicated mechanisms and the supplemental supporting devices which have been heretofore required when brace-supported endless-belt stackers were used.

What I claim is—

1. In a threshing and straw-stacking mechanism, the combination of a main frame and casing, a straw-separating mechanism and a grain-winnowing mechanism in said frame and casing, a straw-receptacle in said casing, a rotary support or base mounted on said casing, a duct from the ejector, a delivery-trunk resting upon said frame and connected to said rotary support and adapted to be turned either rearward from the casing or forward above it, and a brace having its outer end arranged to support the trunk at points relatively near its outer end and inclined downward and inward, and having its inner end arranged to vibrate around the vertical axis of the rotary support, substantially as described.

2. In a pneumatic straw-stacker, the combination of the forcing mechanism for air and straw, the delivery-trunk, the horizontally-vibratable support for the delivery-trunk, a brace connected with the trunk, and a laterally-adjustable support for the brace arranged below the aforesaid support for the delivery-trunk, substantially as set forth.

3. In a pneumatic straw-stacker, the combination of the forcing mechanism for air and straw, the delivery-trunk, the horizontally-vibratable support for the delivery-trunk, a brace for supporting the outer end of the delivery-trunk, and an adjustable support for said brace independent of and disconnected from the said horizontally-vibratable trunk-support, and adapted to support the said brace in line with the axis of the said trunk-support and in a position out of line with said axis, substantially as set forth.

4. The combination, with a supporting-frame having a substantially inclosed chamber, a rotary fan or ejector mounted within said chamber, a duct extending upward from said chamber, the horizontally-vibratable ring or plate mounted above said chamber, the delivery-trunk mounted on said ring, or plate, and adapted to be turned from a position in which its discharge end is in rear of the said chamber to a position in which its discharge end is in front of the rear wall of said chamber, the brace for supporting the projecting portion of the trunk, and a pivotally-mounted support for the inner end of the brace, said support being independent of the vibratable ring or plate and adapted to maintain said inner end of the brace at a point in line with the axis of said ring or plate and also at a point out of said axial line, substantially as and for the purpose set forth.

5. The combination, with a threshing and separating mechanism and the casing therefor, of the straw-ejector casing, the fan or ejector therein, the upward-delivering stationary duct communicating with the ejector-casing, the vertically-adjustable delivery-trunk supported to rotate about a vertical axis passing down through said stationary duct, said delivery-trunk being adapted to receive material from said stationary duct, and a brace extending downwardly from and adapted to support the delivery-trunk and having its lower end arranged to vibrate around the aforesaid vertical axis, substantially as set forth.

6. The combination, with a threshing and separating mechanism, the casing therefor, and the ejector-casing secured to the separator-casing and communicating therewith, of the rotary fan or straw-ejector mounted within the said ejector-casing, the stationary duct for carrying straw upward from the ejector, the vertically-vibratable delivery-trunk having a downward-extending mouth at its lower end through which the straw from said stationary duct is received, a horizontally-rotatable support for said trunk mounted around the upward-extending stationary duct, the brace or depending support for the outer end of the delivery-trunk having its lower end arranged to vibrate around the vertical axis of the delivery-trunk, and the support for the lower end of said brace situated below the stationary straw-duct and outside thereof, substantially as set forth.

7. In a pneumatic straw-stacker, the combination, of the vertically-vibratable straw-delivery duct, a relatively stationary straw-duct below the delivery-duct and through which the straw passes upward to the lower end of the delivery-duct, a substantially horizontally mounted centrally-open rotating mechanism connected to the delivery-duct and surrounding the upper end of said stationary duct, and a brace, for the outer part of the delivery-duct, inclined inward and forward to a support below, and independent of, the said centrally-open rotating mechanism and said brace having its lower end adapted to vibrate substantially concentric with the said rotating mechanism, substantially as set forth.

8. In a pneumatic straw-stacker, the combination, of the vertically-adjustable horizontally-vibrating straw-delivery duct, the straw-ejector, the duct extending from the ejector upward to the adjustable delivery-duct, the brace for the outer end of the delivery-duct having its inner end arranged to vibrate, and a movable carrier independent of the main straw-duct for the brace, and means for fastening said carrier in either of two or more positions, substantially set forth.

9. The combination with the threshing and separating mechanism, of the straw-ejector casing secured to the separator-casing, the fan or ejector therein, the upward-delivering stationary straw-duct, communicating with the ejector-casing, the vertically-adjustable delivery-duct receiving material from and rotating around a vertical axis passing through said stationary duct, the brace for the outer end of the delivery-duct having its lower end arranged to vibrate a movable carrier for said lower end of the brace, and means for fastening said carrier in either of two or more positions, substantially as set forth.

10. The combination, with a threshing and separating mechanism and its casing, of the straw-ejector casing secured to the separator-casing, the fan or ejector therein, the upward-delivering stationary straw-duct communicating with the ejector-casing, the vertically-adjustable delivery-duct receiving material from and rotating around a vertical axis passing through said stationary duct, and the brace for the outer end of the delivery-duct having its lower end arranged to move around the vertical axis of the delivery-trunk, and a carrier movable independently of said trunk for supporting the lower end of the brace, substantially as set forth.

11. In a threshing and separating mechanism, the combination, with the main frame, a fan mounted within a chamber in the frame, and a horizontally-rotatable trunk or spout communicating at one end with the fan-chamber, of a brace having one end connected to the trunk and its outer end connected to a horizontally-rotatable pivot, and means for holding said pivot at the axis of the horizontal movement of the trunk or in a position at one side thereof, whereby the brace will support the trunk whether the same be in working position or swung forward over the main frame, substantially as set forth.

12. In a threshing and separating mechanism, the combination of a supporting-frame, a stacker-spout mounted on a rotatable plate whereby it can be caused to extend rearwardly from the supporting-frame or forward over the same, and a brace connected at one end to said spout and having its other end pivotally connected to the frame whereby it is adapted to support the spout both when the spout extends rearwardly from the supporting-frame and when it extends forward over such frame, substantially as set forth.

13. In a pneumatic straw-stacker, the combination of the supporting-frame, the vertically-adjustable straw-duct above said frame, the brace-rod extending downward and inward from said duct, the hinge at the lower end of the brace, and the swinging carrier for the hinge supported independently of the devices which support the straw-duct.

14. In a pneumatic straw-stacker, the combination of the main supporting-frame, the straw-duct within the frame, the vertically-adjustable straw-duct above the frame, the extensible brace extending downward from the straw-duct, and a lever connected with the brace for throwing its upper end to different vertical positions, substantially as set forth.

15. In a pneumatic straw-stacker, the combination of the frame, the straw-duct therein, the vertically-adjustable straw-duct communicating with the aforesaid duct, the brace extending downward from the adjustable duct and formed in two telescoping parts, the lower of which is supported by a hinge or pivot permitting horizontal vibration of the brace, and means substantially as described engaging with both the parts of the brace and adapted to positively separate them for elongating the brace, substantially as set forth.

16. In a pneumatic straw-stacker, the combination of the supporting-frame, the straw-duct therein, the fan for causing an air-draft through said duct, the vertically-adjustable straw-duct outside of the frame and communicating with the duct therein, the bar or frame connected to and situated by the side of the vertically-adjustable duct, the brace extending downward from and connected to the said bar or frame, and the support for the lower end of the brace adapted to permit a horizontal vibration of the brace, substantially as set forth.

17. In a pneumatic straw-stacker, the combination with the vertically-adjustable straw-duct having an inner section and an outer section movable longitudinally along the inner section, of a bar or frame secured to the inner section and extending outward to points beyond the inner end of the outer section, a brace below the straw-duct having its upper end secured to said bar or frame at a point outside of the inner end of the outer duct-section, and a support for the lower end of the brace permitting horizontal oscillation, substantially as set forth.

18. In a pneumatic straw-stacker, the combination of the vertically-adjustable straw-delivery tube, having an inner section and an outer longitudinally-movable section, the bar H, the strut or connecting piece *h* between said bar and the inner section, said bar extending beyond the inner end of the outer section, the brace extending downward from the said bar and supported by a hinge at its lower end, and means for moving the outer section longitudinally, substantially as set forth.

19. In a pneumatic straw-stacker, the combination of the main frame, the straw-duct therein, the fan for causing an air-blast through said duct, the vertically-adjustable straw-duct outside of the frame and communicating with the duct therein, the downward and inward inclined brace connected at its upper end to the adjustable duct, a hinge for the lower end of said brace, the swinging carrier for said hinge, and the lock for said carrier, substantially as set forth.

20. In a pneumatic straw-stacker, the combination of the vertically-adjustable straw-duct, the fan for causing a blast of air through said duct, the brace connected at its upper end to said duct and extending downward and inward, the hinge for the lower end of said brace, adapted to allow it to swing vertically, and the supplemental hinge or swinging carrier connected with the brace to allow it to swing horizontally, substantially as set forth.

21. In a pneumatic straw-stacker, the combination of the vertically-adjustable straw-duct, the fan for causing a blast of air through said duct, the latter being made of an inner section and a longitudinally-movable outer section, a brace extending downward from the duct, the hinge for the lower end of said brace, and means for moving longitudinally the outer section of the straw-duct, substantially as set forth.

22. In a pneumatic straw-stacker, the combination of the ejector, the vertically-adjustable and horizontally-vibratable delivery-duct for straw and air from the ejector having an inner section and an outer section longitudinally adjustable on the inner section, a supplemental frame for supporting said duct-sections, said frame having one or more standards or levers $g$, $g^4$, which are stationary relatively to the inner duct-section, and a bar extending from the said standards or levers forward along the duct, a brace for supporting the outer end of the said forward-projecting bar, and extending therefrom downward and inward, and means for pivotally supporting the lower inner end of the brace to permit it to vibrate with the delivery-duct, substantially as set forth.

23. In a pneumatic stacker, the combination with the vertically-adjustable, horizontally-vibrating delivery-duct, having an inner section and an outer section longitudinally adjustable on the inner section, of a frame having two standards or levers $g,g^4$, inclined to each other and stationary relative to the inner duct-section, a bar extending forward from said levers or standards, a downward and backward inclined brace, means for connecting the outer end of the brace to the forward-extending bar, and means for pivotally supporting the inner end of the brace, whereby, though stationary relative to the inner section of the duct, it can be horizontally vibrated, substantially as set forth.

24. In a pneumatic stacker, the combination with the vertically-adjustable, laterally-vibratable duct, formed with an inner section, and an outer longitudinally-adjustable section, of a ring secured to the inner duct-section, a bar connected to and extending forward from the said ring, a downward and backward inclined brace, means for connecting the brace to the said bar, said brace being horizontally vibratable with the trunk, a flexible power mechanism having wheels supported on the frame formed by the aforesaid parts, and having a chain or cord mounted on said wheels, and means for connecting the said chain or cord to the outer sliding duct-section, substantially as set forth.

25. In a pneumatic stacker, the combination with the vertically-adjustable, laterally-vibratable trunk, having an inner duct-section and an outer duct-section sliding longitudinally on the inner section, a rotary base connected with the inner section, a standard or lever pivotally connected to the rotary base and stationary relative to the inner duct-section, a bar extending forward along the side of the duct, and having a pivotal connection between its inner end and the rotary base, a chain or cord directly below the duct and connected to the outer sliding duct-section for adjusting it longitudinally, and means for exerting an upwardly-acting force upon the outer end of the said bar for vertically adjusting the duct, substantially as set forth.

26. In a pneumatic stacker, the combination of the ejector mechanism, the rotary base, the delivery-duct having an inner section and an outer section longitudinally adjustable on the inner section, a frame connected with the rotary base and extending forward along the side of the delivery-duct, and a downward and inward inclined brace connected to the said frame at its outer end, and having its inner end supported independently of the rotary base, and adapted to vibrate horizontally in unison with the duct, substantially as set forth.

27. In a pneumatic stacker, the combination of an ejector mechanism, a rotary base or support, a delivery trunk or duct mounted on the rotary base and consisting of an inner section and an outer section telescopically connected to the inner section, a supplemental supporting-frame having one member extending parallel to the duct and its other member inclined downwardly and rearwardly, both said members being mounted to vibrate around the axis of the rotary base or support, means on said frame for adjusting the outer duct-section longitudinally, and means for varying the length of the inclined member of said supplemental frame, substantially as set forth.

28. In a pneumatic straw-stacker, the combination with a straw-duct consisting of an inner and an outer section telescopically connected together, of a ring secured to the outer duct-section, a guiding arm or bar arranged parallel to the straw-duct, a block adapted to engage with the ring on the outer duct-section, means mounted on said arm or bar and adapted to move said block and outer duct-section longitudinally, and independent means connected with said ring for rotating said outer duct-section, substantially as set forth.

29. In a pneumatic straw-stacker, the combination with a straw-duct consisting of an inner section and an outer section telescopically connected together, of a ring secured to the outer section of said duct, a guiding-arm extending parallel to the stacker-tube, a block loosely engaging with the ring on the outer stacker-section, means for moving said block and thereby the outer duct-section longitudinally, and cords or cables connected with said ring on the outer duct-section and extending on opposite sides of such duct, whereby said outer section can be rotated about the inner section, substantially as set forth.

30. In a pneumatic stacker, the combination, with a stacker-tube having an inner section and an outer section telescopically connected together, of a brace for such tube consisting of the arm or member H, extending parallel to the tube, and the member I extending downwardly from the outer end of the said member H, an endless cord or cable passing around guide-wheels on the member H of the brace, and connected with a shaft journaled on the other member I of the brace, a block or guide-piece connected with one side of said cable and loosely engaging with a projection on the outer section of the stacker-tube, and independent cords or cables connected with said outer tube-section and extending on opposite sides thereof, substantially as and for the purpose set forth.

31. In a pneumatic stacker, the combination of a supporting-frame, a straw-delivery duct mounted on a rotatable carrier on said frame, a brace-rod extending downward and inward from said duct and having its lower end connected with a carrier pivoted on the frame, a lock for holding said carrier stationary, and means adapted to be actuated by the brace for releasing said lock, substantially as set forth.

32. In a pneumatic stacker, the combination of a supporting-frame, a straw-delivery duct mounted on a rotatable carrier on said frame, a brace extending downward and inward from said duct and having its lower end connected with a carrier pivoted to the frame, a lock-hook carried by said carrier and adapted to engage with a stationary stud on the frame, and a trip or lock releasing finger connected with said lock and extending into the path of the brace, substantially as set forth.

33. In a pneumatic straw-stacker, the combination of a supporting-frame, a straw-delivery tube or duct mounted on a rotatable carrier on said frame, a brace extending downward and inward from said duct, and having its lower end connected to a swinging carrier by a hinge permitting horizontal vibration of the brace, a lock for connecting the swinging carrier to the frame to hold said hinge-joint of the brace at the axis of the rotatable carrier of the straw-duct, and means for releasing said lock adapted to be actuated from the brace, substantially as set forth.

34. The combination, with a threshing-machine, of a straw-receptacle D arranged at the rear of and adapted to receive material from the thresher, an upward-extending stationary duct communicating with said chamber or straw-receptacle, a pneumatic ejector adapted to force material from said receptacle through said duct, a vertically and horizontally adjustable delivery-duct, communicating with the aforesaid duct, and means for adjusting said delivery-duct, both vertically and horizontally, having actuating devices extending to points below the top of the threshing-machine, and accessible to an operator while standing on the ground, substantially as set forth.

35. The combination with a threshing and separating mechanism, of a straw-receptacle in rear of the separating devices, an upward-extending duct communicating with said straw-receptacle, a pneumatic ejector adapted to force straw from said receptacle through said duct, a longitudinally-extensible delivery-duct mounted on the separator-casing to rotate about the mouth of said upward-extending duct, a support for said delivery-duct extending downward therefrom, means accessible to an operator while standing on the ground for varying the length of said support to adjust the delivery-duct vertically, and means having controlling devices accessible to an operator while standing on the ground for varying the length of said delivery-duct, substantially as set forth.

36. In a pneumatic stacker, the combination of a delivery-duct consisting of two sections telescopically connected together, a support for said duct extending downward therefrom, means for varying the length of said support to adjust the discharge end of the delivery-duct vertically, means for adjusting the outer duct-section longitudinally of the inner duct-section, and means for rotating said outer duct-section axially, all of said adjusting mechanisms having controlling devices accessible to a single operator while standing on the ground, substantially as set forth.

37. The combination, with a threshing-machine, of a stationary upwardly-extending duct at the rear and adjacent to the plane of one of the longitudinal side walls of the thresher, a straw-receptacle, D, arranged at the rear end of the thresher and having its bottom inclined downwardly transversely of the machine toward the lower end of said stationary duct, a blast-fan mounted within a casing arranged in line, longitudinally, with said duct and communicating therewith, and with the aforesaid straw-receptacle D, and an adjustable delivery-duct communicating with and adapted to receive material from the upper end of the said stationary duct, substantially as set forth.

38. The combination with a threshing-machine, of a stationary upwardly-extending duct, F, a straw-receptacle, D, arranged in rear of the thresher in front and at one side of said duct, F, and having its bottom inclined downwardly on lines transverse of the machine toward said duct, a fan-casing arranged in line with said duct and communicating with the lower ends of said receptacle and duct, a fan within said casing, and an adjustable delivery-duct adapted to receive material from the said duct, F, substantially as set forth.

39. The combination with a threshing-machine, of a straw-receptacle, D, arranged at the rear end of and having its bottom inclined on lines transverse of the machine and extending from one of the side walls of the thresher to, or substantially to the line of the opposite side wall, an upwardly-extending stationary duct, F, arranged in rear of the lower end of said receptacle, a fan-casing communicating with the lower end of said receptacle and duct and extending to points below the said receptacle, a fan within said casing, and an adjustable delivery-duct arranged to receive material from said stationary duct, substantially as set forth.

In testimony whereof I affix my signature in presence of two witnesses.

JOHN B. BARTHOLOMEW.

Witnesses:
GEORGE F. CARSON,
ELVAN M. VOORHEES.